US009780591B2

(12) United States Patent
Deokar et al.

(10) Patent No.: US 9,780,591 B2
(45) Date of Patent: Oct. 3, 2017

(54) ADAPTIVE BATTERY PACK

(71) Applicant: SCHNEIDER ELECTRIC IT CORPORATION, West Kingston, RI (US)

(72) Inventors: Vishwas Mohaniraj Deokar, Acton, MA (US); David E. Reilly, Concord, MA (US); Lynn Ernest Schultz, Nashua, NH (US); Damir Klikic, Waltham, MA (US); Rajesh Ghosh, Bangalore (IN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 85 days.

(21) Appl. No.: 14/678,450

(22) Filed: Apr. 3, 2015

(65) Prior Publication Data
US 2016/0294204 A1     Oct. 6, 2016

(51) Int. Cl.
| | | |
|---|---|---|
| *H02J 7/00* | (2006.01) | |
| *H02J 7/04* | (2006.01) | |
| *H02J 1/00* | (2006.01) | |
| *H02M 3/335* | (2006.01) | |
| *H02J 7/34* | (2006.01) | |

(Continued)

(52) U.S. Cl.
CPC .......... *H02J 7/0068* (2013.01); *H02J 7/0013* (2013.01); *H02J 7/0065* (2013.01); *H02J 7/34* (2013.01); *H02M 3/33546* (2013.01); *H02M 3/33561* (2013.01); *H02M 3/33584* (2013.01); *H02M 3/337* (2013.01); *H02M 2001/0058* (2013.01);

(Continued)

(58) Field of Classification Search
CPC .............................. H02J 7/0068; H02J 7/0013
USPC ............................... 320/112, 140; 307/66, 82
See application file for complete search history.

(56) References Cited

U.S. PATENT DOCUMENTS

| | | | | |
|---|---|---|---|---|
| 4,860,185 A | * | 8/1989 | Brewer ..................... | G06F 1/28 307/66 |
| 6,507,506 B1 | * | 1/2003 | Pinas .................. | B60L 11/1851 307/10.1 |

(Continued)

FOREIGN PATENT DOCUMENTS

WO        2014/209368 A1      12/2014

OTHER PUBLICATIONS

Notification of Transmittal of the International Search Report and the Written Opinion of the International Searching Authority from corresponding PCT/US2016/025632 dated Jul. 5, 2016.

*Primary Examiner* — M'Baye Diao
(74) *Attorney, Agent, or Firm* — Lando & Anastasi, LLP

(57) ABSTRACT

According to at least one aspect, embodiments herein provide an adaptive battery pack module comprising a Li-ion battery, a low-voltage bus coupled to the Li-ion battery, a bi-directional DC-DC converter coupled to the low-voltage bus, a low-voltage output coupled to the low-voltage bus, a high-voltage output, and a high-voltage bus coupled between the bi-directional DC-DC converter and the high-voltage output, wherein the low-voltage output is configured to be coupled to at least one Li-ion battery of at least one external battery pack module, and wherein the bi-directional DC-DC converter is configured to receive DC power from the Li-ion battery and the at least one Li-ion battery of the at least one external battery pack module via the low-voltage bus, convert the received DC power into output DC power, and provide the output DC power to the high-voltage bus.

20 Claims, 14 Drawing Sheets

(51) Int. Cl.
  *H02M 3/337* (2006.01)
  *H02M 1/00* (2006.01)
(52) U.S. Cl.
  CPC ...... *H02M 2001/0077* (2013.01); *Y02B 40/90* (2013.01); *Y02B 70/1491* (2013.01)

(56) References Cited

U.S. PATENT DOCUMENTS

| | | | | |
|---|---|---|---|---|
| 6,803,677 | B2* | 10/2004 | Algrain | H02M 3/33584 |
| | | | | 307/44 |
| 8,482,155 | B2* | 7/2013 | Choi | H02J 3/32 |
| | | | | 307/71 |
| 8,929,099 | B2* | 1/2015 | Kepley | H02M 3/33584 |
| | | | | 363/17 |
| 8,975,781 | B2* | 3/2015 | Zhang | G21D 1/02 |
| | | | | 307/48 |
| 2007/0276556 | A1* | 11/2007 | Noel | B60K 6/46 |
| | | | | 701/22 |
| 2008/0094013 | A1 | 4/2008 | Su | |
| 2008/0310195 | A1 | 12/2008 | Seberger et al. | |
| 2009/0145674 | A1* | 6/2009 | Lee | B60K 6/405 |
| | | | | 180/65.1 |
| 2013/0234669 | A1 | 9/2013 | Huang et al. | |
| 2015/0283963 | A1* | 10/2015 | Janarthanam | B60K 6/48 |
| | | | | 307/9.1 |
| 2015/0283964 | A1* | 10/2015 | Janarthanam | B60L 11/12 |
| | | | | 307/9.1 |

* cited by examiner

ADAPTIVE BATTERY PACK

BACKGROUND OF INVENTION

1. Field of Invention

At least some embodiments described herein relate generally to a Lithium-Ion (Li-ion) based adaptive battery pack.

2. Discussion of Related Art

An electric battery is a device including one or more electrochemical cells that convert stored chemical energy into electrical energy. There are multiple different types of battery technologies. For example, one common type of battery is a Valve-Regulated Lead-Acid (VRLA) battery. A typical VRLA battery is a rechargeable battery including two plates of lead, which serve as electrodes, suspended in an electrolyte solution. In a discharge process, the lead plates react with the electrolyte solution to produce a voltage across the plates. Another type of battery is a Lithium-ion (Li-ion) battery. Common Li-ion batteries use a lithium compound as one electrode material and carbon as another electrode material. In a discharge process of a typical Li-ion battery, lithium ions move from a negative electrode to a positive electrode, through an electrolyte, generating a voltage. As lithium is a highly reactive element, Li-ion batteries typically have high energy density.

SUMMARY OF INVENTION

At least one aspect of the invention is directed to an adaptive battery pack module comprising a Li-ion battery, a low-voltage bus coupled to the Li-ion battery, a bi-directional DC-DC converter coupled to the low-voltage bus, a low-voltage output coupled to the low-voltage bus, a high-voltage output, and a high-voltage bus coupled between the bi-directional DC-DC converter and the high-voltage output, wherein the low-voltage output is configured to be coupled to at least one Li-ion battery of at least one external battery pack module, and wherein the bi-directional DC-DC converter is configured to receive DC power from the Li-ion battery and the at least one Li-ion battery of the at least one external battery pack module via the low-voltage bus, convert the received DC power into output DC power, and provide the output DC power to the high-voltage bus.

According to one embodiment, the bi-directional DC-DC converter is configured to provide galvanic isolation between the low-voltage bus and the high-voltage bus. In one embodiment, the bi-directional DC-DC converter includes a series resonant converter. In one embodiment, the bi-directional DC-DC converter includes one of a full bridge to full bridge converter and a full bridge to half bridge converter. In another embodiment, the bi-directional DC-DC converter includes a transformer coupled between the low-voltage bus and the high-voltage bus.

According to another embodiment, the high voltage output is configured to be coupled to an output of the at least one external battery pack module in one of a series configuration and a parallel configuration.

According to one embodiment, the high voltage output is configured to be coupled to an external DC power source, and wherein the bi-directional DC-DC converter is further configured to receive, via the high voltage output, DC power from the external DC power source, convert the received DC power from the external DC power source into low voltage DC power, and provide the low voltage DC power to the Li-ion battery and the at least one Li-ion battery of the at least one external battery pack module via the low-voltage bus. In one embodiment, the adaptive batter pack module is in combination with a rectifier, a DC bus, and an inverter, wherein the DC bus is coupled between the rectifier and the inverter and configured to receive rectified DC power from the rectifier, and wherein the high-voltage output is further configured to be coupled to the DC bus and to receive the rectified DC power from the DC bus.

According to another embodiment, the Li-ion battery includes a plurality of cells and a Battery Management System (BMS) configured to monitor the plurality of cells and operate the Li-ion battery to output DC power at a desired voltage level.

According to one embodiment, the adaptive battery pack module further comprises a serial communication link coupled between the Li-ion battery and the bi-directional DC-DC converter. In another embodiment, the adaptive battery pack module further comprises a communication bus coupled between the bidirectional DC-DC converter and a communication interface.

Another aspect of the invention is directed to a method for providing DC power to a load with a plurality of adaptive battery pack modules, each module comprising a Li-ion battery configured to provide DC power, a low-voltage bus coupled to the Li-ion battery, a bi-directional DC-DC converter coupled to the low-voltage bus, and a high-voltage bus coupled to the bi-directional DC-DC converter, the method comprising coupling the low-voltage busses of each module together in parallel, sharing, via the low-voltage busses coupled in parallel, the DC power from each Li-ion battery with the bi-directional DC-DC converter of each module, operating each bi-directional DC-DC converter in a boost mode of operation to convert the shared DC power into output DC power, combining the output DC power from each bi-directional DC-DC converter together to generate a combined output DC power, and providing the combined output DC power to the load.

According to one embodiment, the method further comprises receiving, with each bi-directional DC-DC converter, DC power from an external DC power source, operating each bi-directional DC-DC converter in a charge mode of operation to convert the DC power from the external DC power source into low voltage DC power, and charging, via the low-voltage busses coupled in parallel, each Li-ion battery with the low voltage DC power.

According to another embodiment, the method further comprises coupling the high-voltage busses of each module together in series, and combining the output DC power from each bi-directional DC-DC converter together includes combining the output DC power from each bi-directional DC-DC converter together to generate the combined output DC power having a desired output voltage level.

According to one embodiment, the method further comprises coupling the high-voltage busses of each module together in parallel, and combining the output DC power from each bi-directional DC-DC converter together includes combining the output DC power from each bi-directional DC-DC converter together to generate the combined output DC power having one of a desired output power capacity and runtime. In another embodiment, the method further comprises providing galvanic isolation between the low-voltage bus and the high-voltage bus of each module.

At least one aspect of the invention is directed to a battery system comprising a plurality of adaptive battery pack modules, each module comprising a Li-ion battery configured to provide DC power, a bi-directional DC-DC converter coupled to the Li-ion battery, and an output, and means for sharing DC power, from the Li-ion batteries, between the bi-directional DC-DC converter of each of the plurality of modules, wherein the bi-directional DC-DC converter of each of the plurality of module is configured to receive the shared DC power from the Li-ion batteries, convert the shared DC power into output DC power, and provide the output DC power to the output.

According to one embodiment, the battery system further comprises means for providing galvanic isolation between each of the plurality of adaptive battery pack modules. In another embodiment, the battery system further comprises means for combining the output DC power of each bi-directional DC-DC converter to generate a combined output DC power having one of a desired output voltage, power capacity, and runtime.

According to another embodiment, the Li-ion battery of a first one of the plurality of adaptive battery pack modules is constructed of a first battery cell technology and the Li-ion battery of a second one of the plurality of adaptive battery pack modules is constructed of a second battery cell technology which is different than the first battery cell technology.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
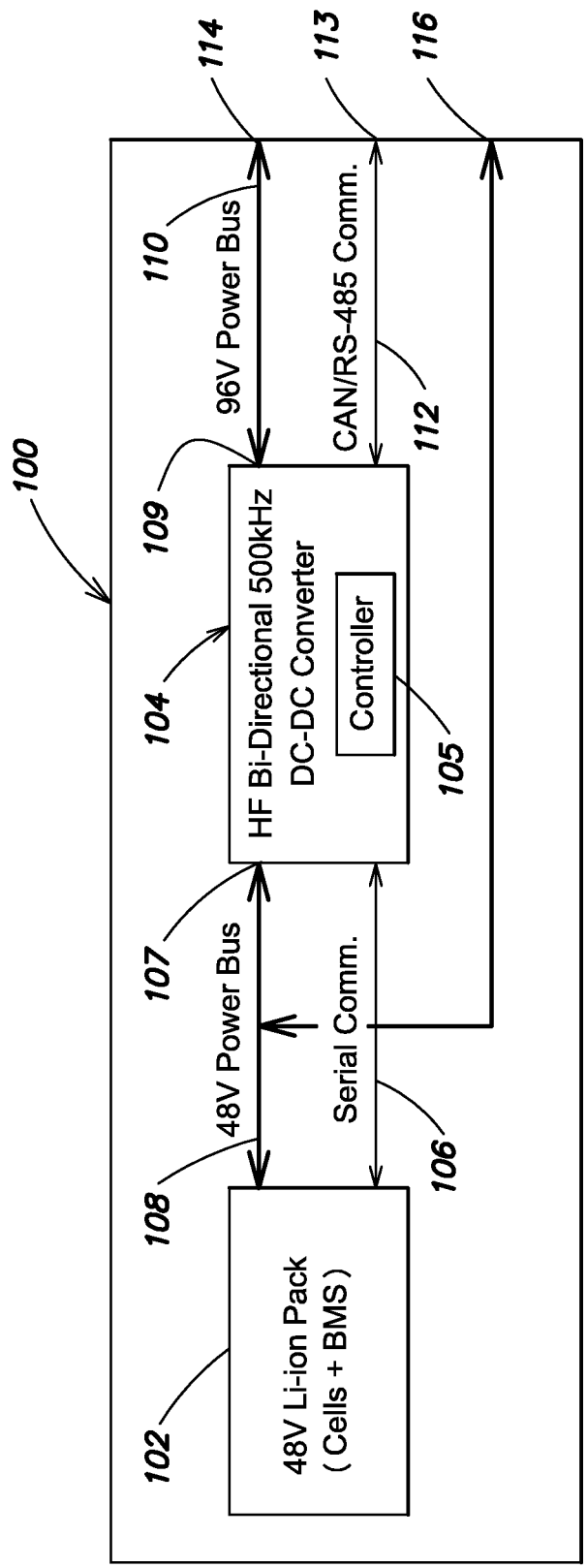
FIG. 1 is a block diagram of a Li-ion adaptive battery pack according to aspects of the current invention.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, VRLA batteries are a common type of battery technology used in a variety of different applications. However, VRLA batteries suffer from poor performance in wide temperature range environments. Single phase uninterruptible power supplies used in non-IT applications (e.g., wind turbines, solar PhotoVoltaic (PV) systems, intelligent traffic light systems, etc.) typically require a battery with a wide operating temperature range (e.g., −20° C. to +60° C.), long life cycle (e.g., 5-7 years), and a relatively long storage life (e.g., >1 year). Standard VRLA battery technology is not suitable for such an application as at high temperatures, the battery chemistry becomes more active causing degradation of the battery cell. Also, at low temperatures, the battery chemistry slows down, reducing the capacity to deliver rated current and runtime.

Lithium-Ion (Li-ion), an emerging battery cell technology, is extremely popular in mobile, power tool, and electric vehicle applications and is commonly used to solve the wide temperature range and battery life issues associated with VRLA batteries as it generally provides longer cycle and calendar life over a wider temperature range than VRLA batteries. In addition, Li-ion battery technology has large weight and volume advantages as compared to VLRA batteries. For example, for a given value of stored energy, a Li-ion battery may achieve a reduction of three to five times as compared to a VRLA technology.

However, some challenges exist in developing high voltage battery packs (e.g., 96 Vdc, 192 Vdc, +/−192 Vdc) using Li-ion battery technology. For example, regulatory compliance (e.g., Underwriters Laboratories (UL) certification) is challenging for Li-ion battery packs having voltages >60V. This typically leads to a higher cost battery pack and a more time consuming effort to produce the battery pack. There are also limited systems integrators that can develop Li-ion high voltage battery packs for applications requiring >48V. In addition, there is typically a long and complex development period (e.g., 24+ months) for creating a new Li-ion battery pack for a specified power rating. Integrated Circuits (IC) configured to monitor high voltage battery strings are not readily available. Creating a +/− battery bus (e.g., +/−192 Vdc) with Li-ion battery technology is typically complex and expensive, and using multiple Li-ion cells may have a negative impact on reliability and robustness.

In one embodiment, a Li-ion adaptive battery pack is provided that utilizes a building block approach to create high battery voltage for energy storage applications (e.g., such as with an Uninterruptible Power Supply (UPS)). The adaptive battery pack module includes a Li-ion battery and a high frequency (e.g., >500 kHz), high efficiency (e.g., >96%), bidirectional, and galvanically isolated DC-DC converter. The bidirectional converter serves as both a charger and a boost converter and the galvanic isolation of the converter allows adaptive battery packs to be connected in series or parallel on the HV side while being independently controlled. By connecting the Low Voltage (LV) side of multiple adaptive battery pack modules together in parallel, power can be shared between the adaptive battery pack modules. Further, by also connecting the High Voltage (HV) side of the multiple adaptive battery pack modules together in parallel or series, a wide range of voltage and power requirements can be met.

Figure 2:
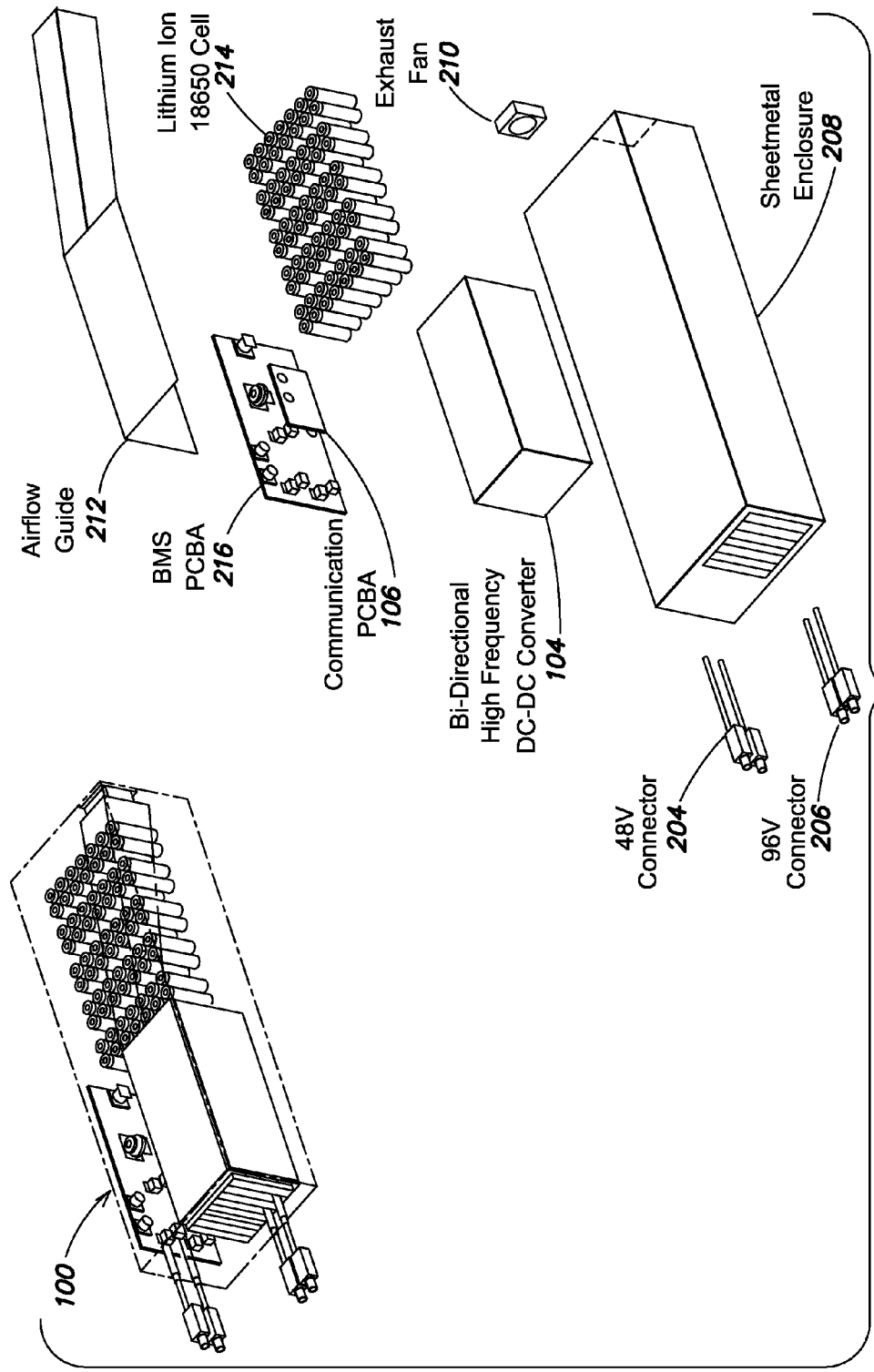
FIG. 2 is a 3D illustration of a Li-ion adaptive battery pack according to aspects of the current invention.

FIG. 1 is a block diagram of a Li-ion adaptive battery pack module 100 according to aspects of the current invention and FIG. 2 is a 3D illustration of the Li-ion adaptive battery pack module 100. The module 100 includes a Li-ion battery 102, a bidirectional DC-DC converter 104, a serial communication link 106, a LV power bus 108, a HV power bus 110, and a communication bus 112. According to at least one embodiment, the module 100 further includes a LV connector 204, a HV connector 206, an enclosure 208, an exhaust fan 210, and an airflow guide 212.

The serial communication link 106 is coupled between the battery 102 and the converter 104. The LV power bus 108 is coupled between the battery 102 and the converter 104 and also coupled to a LV output 116. The LV output 116 is coupled to the LV connector 204. The HV power bus 110 is coupled between the converter 104 and a HV output 114. The HV output 114 is coupled to the HV connector 206. The communication bus 112 is coupled between the converter 104 and a communication interface 113. According to one embodiment, the communication interface 113 is also coupled to the HC connector 206; however, in other embodiments, the communication interface 113 may be coupled to an independent communication line. The Li-ion battery 102, bidirectional DC-DC converter 104, serial communication link 106, LV power bus 108, HV power bus 110, communication bus 112, exhaust fan 210, and airflow guide 212 are included within the enclosure 208. In one embodiment, the enclosure 208 is made of sheet metal; however, in other embodiments, the enclosure 208 may be made of any other appropriate material. The exhaust fan 210 is coupled to the airflow guide 212 and the airflow guide 212 extends through the enclosure 208, from the DC-DC converter 104 to the exhaust fan 210.

The Li-ion battery 102 includes a group of battery cells 214 and a dedicated Battery Management System (BMS) 216 coupled to the group of battery cells 214 and the LV power bus 108. In one embodiment, the Li-ion battery 102 is configured to output a 48V output voltage to the LV power bus 108 and includes a group of Li-ion cells (e.g., 13 Li-ion cells), stacked in series, to generate the 48V output voltage (i.e., a "48V string"). However, in other embodiments, the Li-ion battery 102 may include any number of different cells, arranged in any other appropriate configuration, to generate any other desired output voltage.

The BMS 216 of the battery 102 monitors the condition of the battery cells 214 and operates the battery 102 to maintain the desired output voltage. For example, according to at least one embodiment, the BMS 216 utilizes overvoltage, undervoltage, and over-temperature protection circuitry to monitor and control the battery 102. In one embodiment, the battery 102 also includes a transceiver (e.g., a Universal Asynchronous Receiver/Transmitter (UART)) to communicate with the converter 104 via the serial communication link 106. According to one embodiment, the serial communication link 106 is a Serial Peripheral Interface (SPI) bus; however, in other embodiments, a different type of serial communication link may be utilized. The airflow guide 212 and the exhaust fan 210 operate to provide appropriate cooling to the adaptive battery pack module 100.

The communication bus 112 allows communication between the converter 104 (i.e., the controller 105 within the converter 104) and an external controller/system (e.g., a UPS controller) that is operating multiple modules 100. In one embodiment, a multi-drop communication network is utilized to allow communication between the adaptive battery pack module 100 and the external controller/system. For example, in some embodiments, the communication bus 112 is an RS-485 communications bus or a Controller Area Network (CAN) bus utilizing a master/slave configuration (e.g., the external controller/system as the master and the modules 100 as the slaves). A request response protocol like MODBUS could be used for transferring data and/or information (regarding status, control, configuration etc.) between the master system (e.g., the external controller/system) and the modules 100. In one embodiment, each module 100 is assigned a unique address by the master system. For example, in at least one embodiment, the auto-addressing method described in Patent Cooperation Treaty (PCT) Application Number PCT/US2013/048596, titled "SYSTEM AND METHOD FOR AUTOMATICALLY ADDRESSING DEVICES IN A MULTI-DROP MASTER/SLAVE NETWORK", filed on Jun. 28, 2013, which is herein incorporated by reference in its entirety, is utilized.

According to one embodiment, the bidirectional DC-DC converter 104 is a high frequency (e.g., >500 kHz) and high efficiency (e.g., >96%) DC-DC converter; however, in other embodiments, any other appropriate type of bidirectional DC-DC converter may be utilized. The converter includes an input 107, output 109, and a local controller 105. The local controller 105 operates the converter 104 in a boost mode of operation or a charge mode of operation based on information/instructions received from an external main system/controller via the communication bus 112. In the boost mode of operation, the converter 104 steps up the voltage on the LV power bus 108 (e.g., 48V) provided by the battery 102 to a desired output voltage (e.g., 96V) and provides the output voltage to a load (e.g., an external DC Bus) via the HV power bus 110 and the HV connector 206. In the charge mode of operation, the converter 104 steps down the voltage on the HV power bus 110 (e.g., 96V provided by an external DC bus to the HV connector 206) to a desired charge voltage (e.g., 48V) and provides the charge voltage to the LV power bus 108 to charge the battery 102.

The converter 104 also provides galvanic isolation between the LV power bus 108 and the HV power bus 110. For example, in one embodiment, the converter 104 includes a transformer having a first winding coupled to the LV power bus 108 and a second winding coupled to the HV power bus 110.

Figure 3:
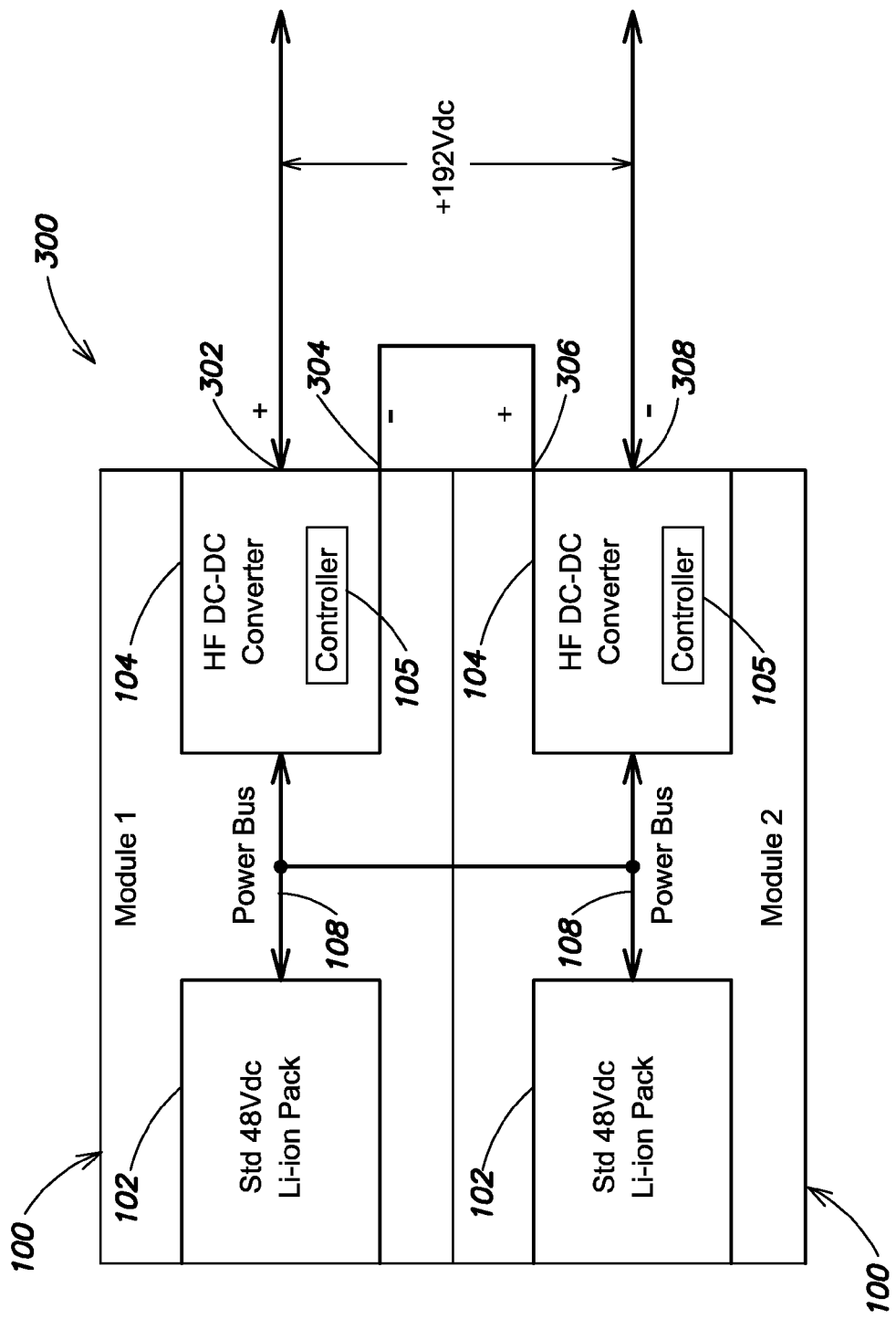
FIG. 3 is a block diagram illustrating the coupling of two Li-ion adaptive battery pack modules in series according to aspects of the current invention.

The adaptive battery pack module 100 is configured to be coupled together, either in series or in parallel, with other similar adaptive battery packs. For example, FIG. 3 is a block diagram illustrating the coupling of two 48V Li-ion adaptive battery packs 100 (i.e., Module 1 and Module 2) in a series configuration 300. The LV side of each pack 100 (i.e., the LV power bus 108) is coupled together in parallel while the HV side of each pack 100 (i.e., the HV power bus 110) is coupled together in series. A positive terminal 302 of the HV connector 206 of Module 1 and a negative terminal 308 of the HV connector 206 of Module 2 are coupled to a load. A negative terminal 304 of the HV connector 206 of Module 1 is coupled to a positive terminal 306 of the HV connector 206 of Module 2.

The coupling of the LV power busses 108 together in parallel allows each module 100 to share the voltage and current provided by each battery 102 equally. For example, as shown in FIG. 3, the converter 104 of each module 100 draws current and 48 Vdc from its own corresponding battery 102 and the battery 102 of the other module 100. The controller 105 of each module 100 operates its corresponding converter 104 in a boost mode of operation to output a 96 Vdc voltage. By coupling the HV power busses 110 of the modules 100 (i.e., Module 1 and Module 1) together in series, the output voltage of each module 100 is combined to generate a combined output voltage of 192 Vdc, which can be provided to the load. In addition, as the modules 100 are galvanically isolated; each battery pack 100 operates independently of the other battery pack 100 and is individually managed by its own controller 105 to generate a desired output voltage.

Figure 4:
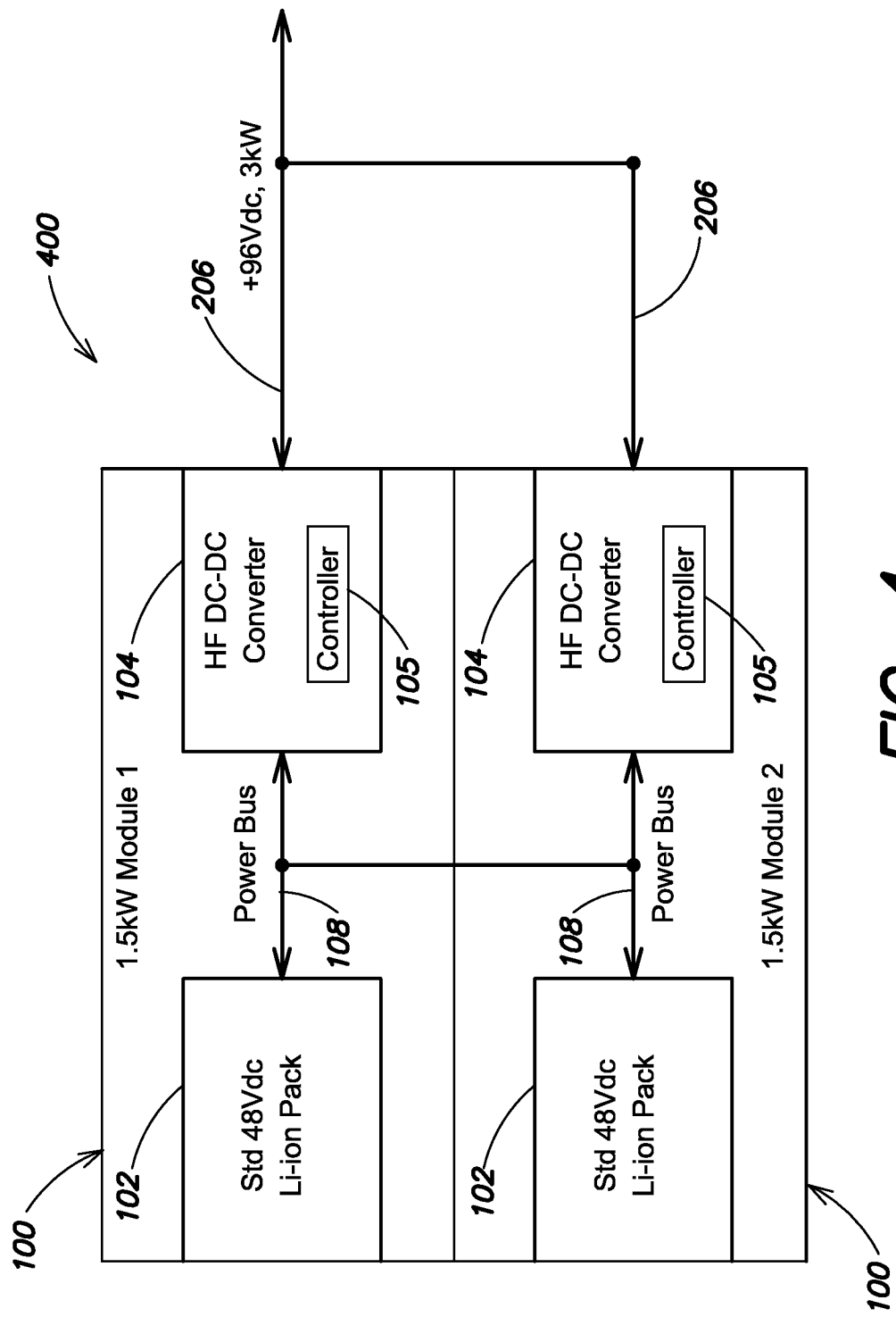
FIG. 4 is a block diagram illustrating the coupling of two Li-ion adaptive battery pack modules in parallel according to aspects of the current invention.

FIG. 4 is a block diagram illustrating the coupling of two 1.5 kW Li-ion adaptive battery pack modules 100 (i.e., Module 1 and Module 2) in a parallel configuration 400. The LV side of each module 100 (i.e., the LV power bus 108) is coupled together in parallel while the HV side of each pack 100 (i.e., the HV power bus 110) is coupled together in parallel. The HV connector 206 of each module is coupled to a load in parallel.

The coupling of the LV power busses 108 together in parallel allows each module 100 to share the voltage and current provided by each battery 102 equally. For example, as shown in FIG. 4, the converter 104 of each module 100 draws power from its own corresponding battery 102 and the battery 102 of the other module 100. The controller 105 of each module 100 operates its corresponding converter 104 in a boost mode of operation to output a 96 Vdc voltage. By coupling the HV power busses 110 of the 1.5 kW modules 100 (i.e., Module 1 and Module 1) together in parallel, the output power of each module is combined to generate a combined output of 96 Vdc, 3 kW, which can be provided to the load. In addition, as the modules 100 are galvanically isolated; each battery pack 100 operates independently of the other battery pack 100 and is individually managed by its own controller 105 to generate desired output power.

Figure 5:
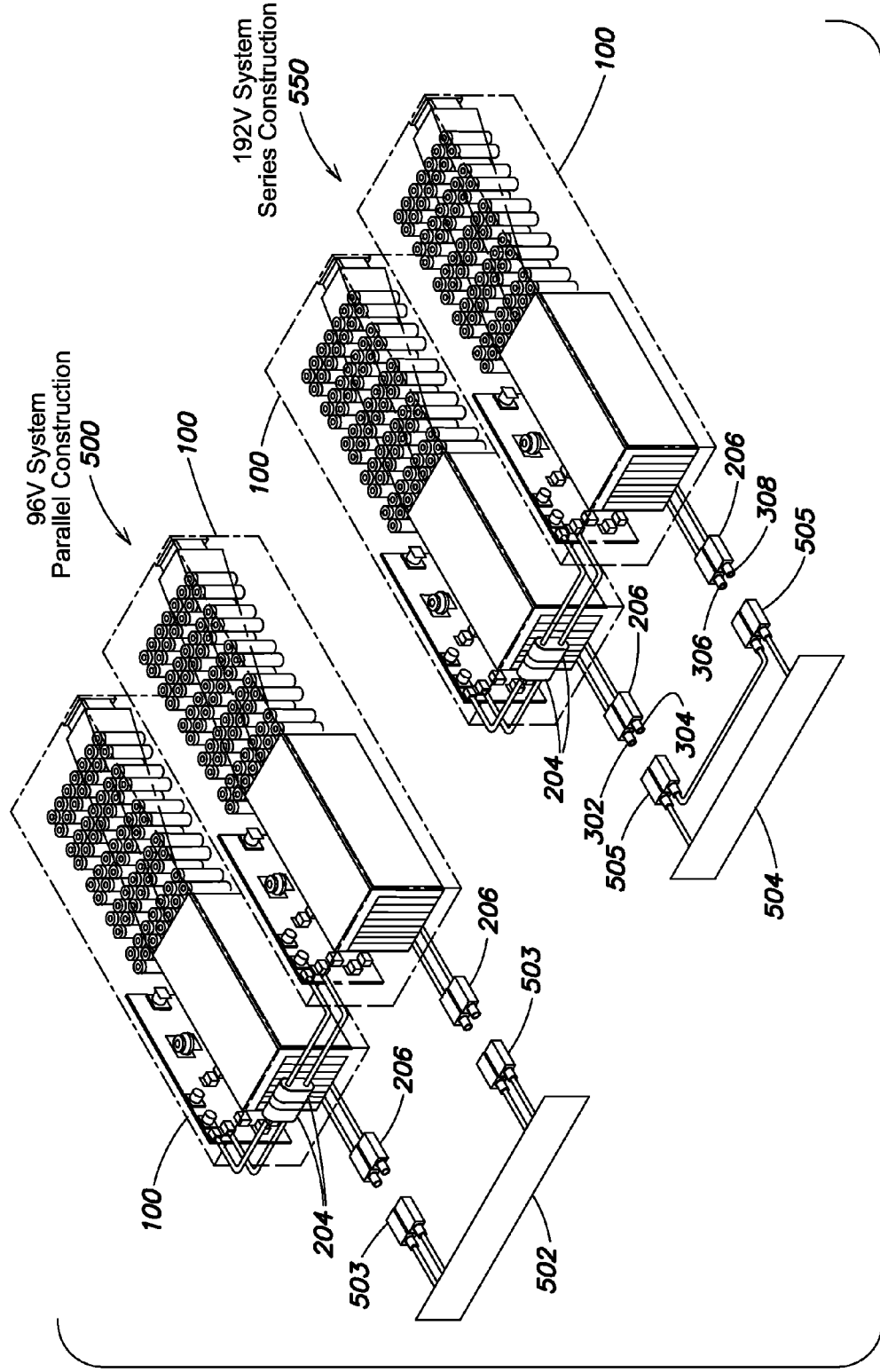
FIG. 5 includes a 3D illustration of two Li-ion adaptive battery pack modules coupled together in parallel and a 3D illustration of two Li-ion adaptive battery pack modules coupled together in series according to aspects of the current invention.

FIG. 5 includes a 3D illustration 500 of two Li-ion adaptive battery pack modules 100 coupled together in parallel and a 3D illustration 550 of two Li-ion adaptive battery pack modules 100 coupled together in series. In a parallel configuration 500, the LV connector 204 of each 1.5 kW module 100 is coupled together in parallel while the HV connector 206 of each module 100 is coupled to a load 502 (e.g., a DC bus) in parallel, resulting in an output of 96 Vdc, 3 kW being provided to the load 502. According to one embodiment, the HV connectors 206 of each module are coupled directly to the load 502; however, in other embodiments, an HV connector 206 may be coupled to the load 502 via an intermediary connector 503 (e.g., as shown in FIG. 5). Also, as discussed above, as the modules 100 are galvanically isolated; each battery pack 100 operates independently of the other battery pack 100 and is individually managed by its own controller 105 to generate a desired output power.

In the serial configuration 550, the LV connector 204 of each module 100 is coupled together in parallel, the positive terminal 302 of the HV connector 206 of a first module 100 and the negative terminal 308 of the HV connector 206 of a second module 100 are coupled to a load, and the negative terminal 304 of the HV connector 206 of the first module 100 is coupled to a positive terminal 306 of the HV connector 206 of the second module 100. Such a configuration results in an output voltage of 192 Vdc being provided to the load 504. According to one embodiment, each HV connector 206 is coupled directly to the load 504 and to the HV connector 206 of the other module 100; however, in other embodiments, each HV connector 206 is coupled to the load 504 and to the HV connector 206 of the other module 100 via an intermediary connector 505 (e.g., as shown in FIG. 5). Also, as discussed above, as the modules 100 are galvanically isolated; each battery pack 100 operates independently of the other battery pack 100 and is individually managed by its own controller 105 to generate desired output voltage.

Figure 6:
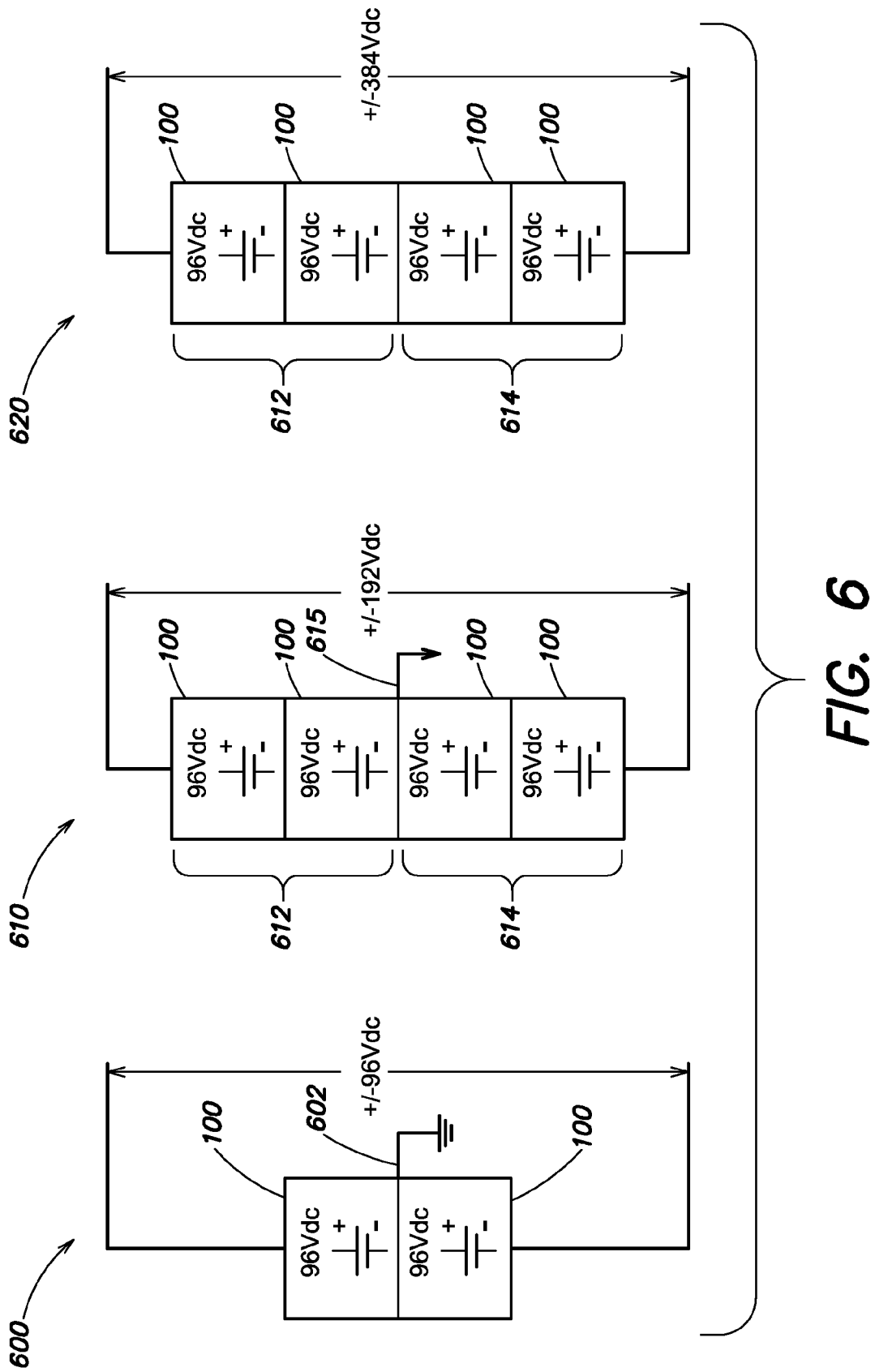
FIG. 6 includes block diagrams of multiple different Li-ion adaptive battery pack module serial configurations according to aspects of the current invention.
Figure 7:
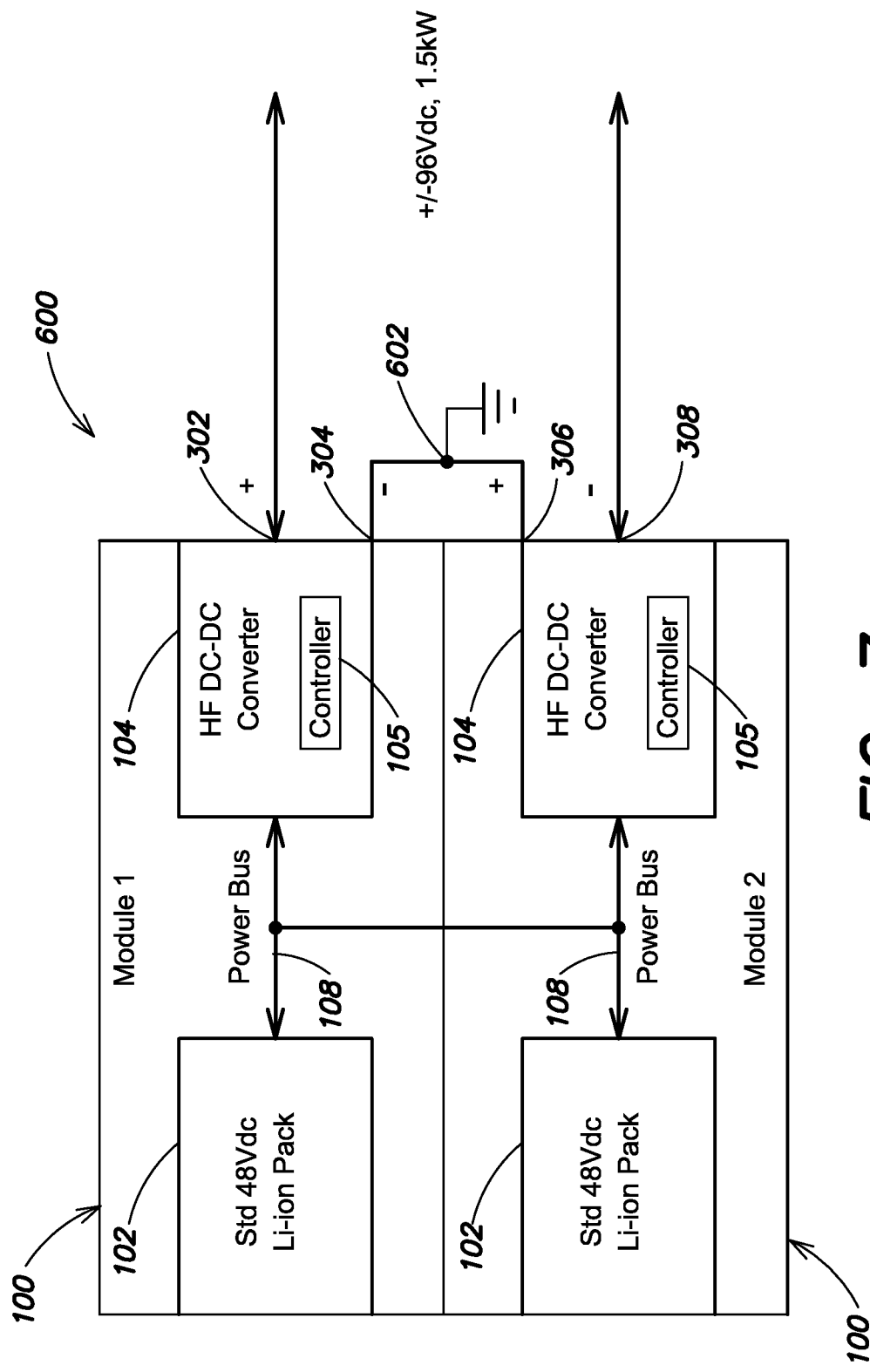
FIG. 7 is a block diagram illustrating the coupling of two Li-ion adaptive battery pack modules in series with a grounded center tap according to aspects of the current invention.

The Li-ion adaptive battery pack modules 100 can be coupled together in any number of different configurations to generate desired output voltage, output power capacity, and/or runtime. For example, FIG. 6 includes block diagrams of multiple different Li-ion adaptive battery pack module serial configurations. The first serial configuration 600 is substantially the same as the serial configuration 300 shown in FIG. 3 except that a grounded center tap 602 is also coupled in series with the modules 100. For example, as shown in FIG. 7, the negative terminal 304 of the HV connector 206 of Module 1 and the positive terminal 306 of the HV connector 206 of Module 2 are coupled to the grounded center tap 602. When the HV sides of the modules 100 and the grounded center tap 602 are coupled in series as shown in the configuration 600 of FIG. 7, +/−96 Vdc is provided to the output.

In the second configuration 610, two pairs of Li-ion adaptive battery pack modules 100 are coupled in series with a grounded center tap 615 to provide +/−192 Vdc to a load. The LV side of each module 100 in the first pair 612 is coupled together in parallel, resulting in each module 100 in the first pair 612 drawing current and 48 Vdc from its own battery as well as current and 48 Vdc from the other battery of the other module 100 in the first pair 612. The LV side of each module 100 in the second pair 614 is coupled together in parallel, resulting in each module 100 in the second pair 614 drawing current and 48 Vdc from its own battery as well as current and 48 Vdc from the other battery of the other module 100 in the second pair 614. As a result, the converter of each module 100 in the first pair 612 and the second pair 614 outputs 96 Vdc. When the HV sides of the first pair 612 of modules 100, the HV sides of the second pair 614 of modules 100, and the grounded center tap 615 are coupled in series as shown in the configuration 610 of FIG. 6, +/−192 Vdc is provided to the output.

The third configuration 620 is substantially the same as the second configuration 610 except that the grounded center tap 615 has been removed. When the HV sides of the first pair 612 of modules 100 and the HV sides of the second pair 614 of modules 100 are coupled in series as shown in the configuration 620 of FIG. 6, 384 Vdc is provided to the output.

Figure 8:
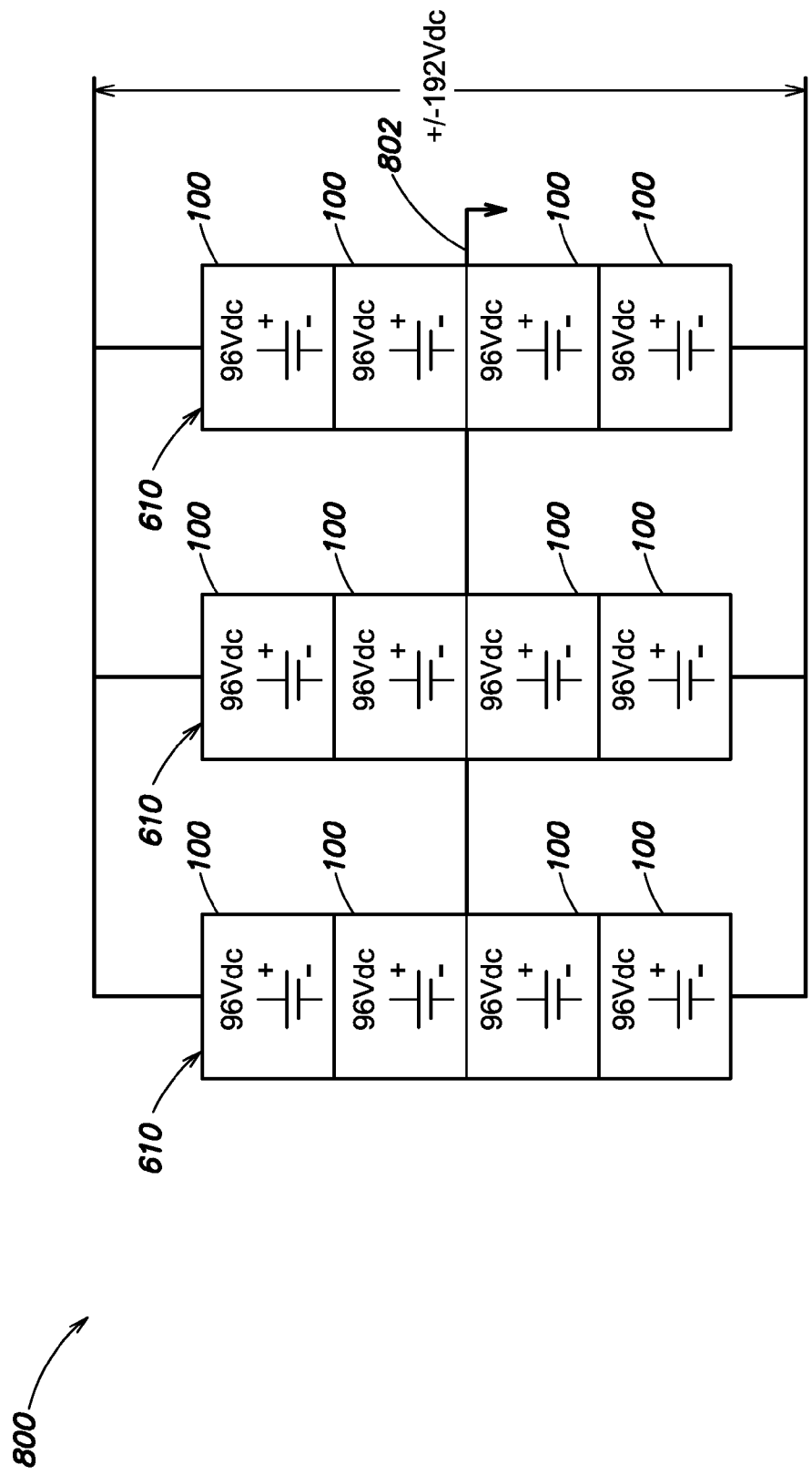
FIG. 8 is a block diagram illustrating a parallel configuration of Li-ion adaptive battery pack modules according to aspects of the current invention.

FIG. 8 is a block diagram illustrating a parallel configuration 800 of Li-ion adaptive battery pack modules 100. The parallel configuration 800 includes multiple groups of modules 100 coupled in series with a grounded center tap 802 (e.g., as shown in the serial configuration 610 of FIG. 6). As described above, each serially configured group of modules 100 provides +/−192 Vdc to the output. When the groups of modules 100 are coupled together in parallel as shown in FIG. 8, the voltage provided to the output remains at +/−192 Vdc; however, the power capacity and runtime of the configuration 800 is increased.

Figure 9:
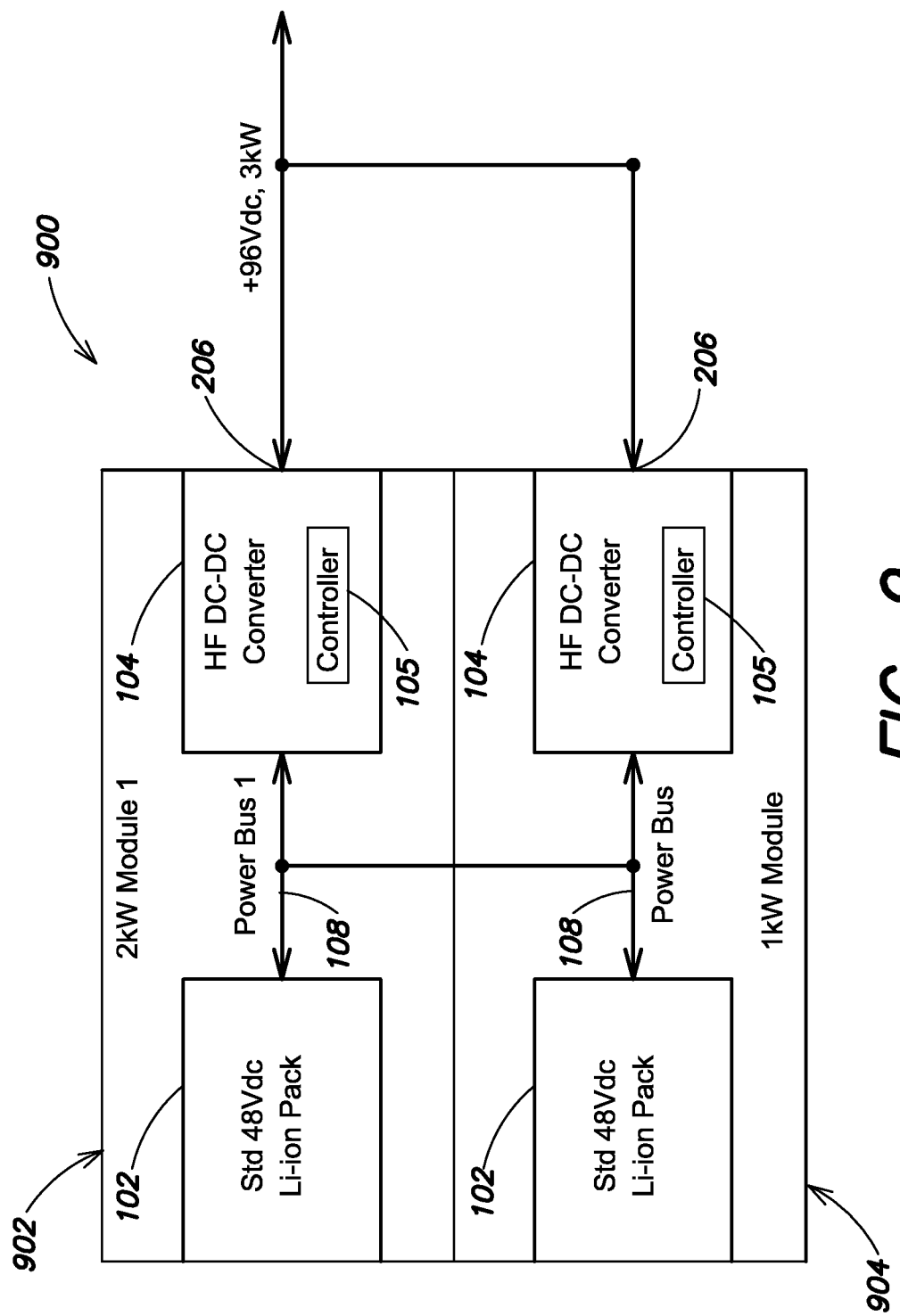
FIG. 9 is a block diagram illustrating a parallel configuration of Li-ion adaptive battery pack modules having different power capabilities according to aspects of the current invention.

In at least one embodiment, the coupling of multiple LV power busses 108 together in parallel allows for modules 100 having different capabilities to be coupled together. For example, FIG. 9 is a block diagram illustrating a parallel configuration 900 of Li-ion adaptive battery pack modules having different power capabilities. In the configuration 900, a first module 902 and a second module 904 are coupled together in parallel (e.g., as similarly discussed above with regard to FIG. 4). The first module 902 and the second module 904 are substantially the same as the modules 100 discussed above with regard to FIG. 1, except that the first module 902 has a power capacity of 2 kW and the second module 904 has a power capacity of 1 kW.

The coupling of the LV power busses 108 together in parallel allows each module 902, 904 to share the voltage and current provided by each battery 102 equally, even though the modules 902, 904 have different capacity. For example, as shown in FIG. 9, the converter 104 of each module 902, 904 draws power from its own corresponding battery 102 and the battery 102 of the other module 902, 904. The controller 105 of each module 902, 904 operates its corresponding converter 104 in a boost mode of operation to output a 96 Vdc voltage. By coupling the HV connector 206 of the 1 kW module 904 in parallel with the HV connector 206 of the 2 kW module 902, an output of 96 Vdc, 3 kW can be provided to the load.

In addition, as each module 902, 904 coupled in parallel shares voltage and current from the batteries 102 equally; in at least one embodiment, if the batteries 102 are unequally charged, the configuration 900 may operate to automatically equalize the charge on the batteries 102. For example, as the converter 104 draws power from both the battery 102 of the 2 kW module 902 and the battery 102 of the 1 kW module 904, if the charge on the battery 102 of the 2 kW module 902 is insufficient to provide necessary power to the converter 104, the converter 104 will draw more power from the higher charged battery 102 of the 1 kW module 904 to compensate for the insufficient charge on its own battery 102. After a period of time, the charge on the batteries 102 will equalize and the converters 104 will draw equal power from each battery 102.

Figure 10:
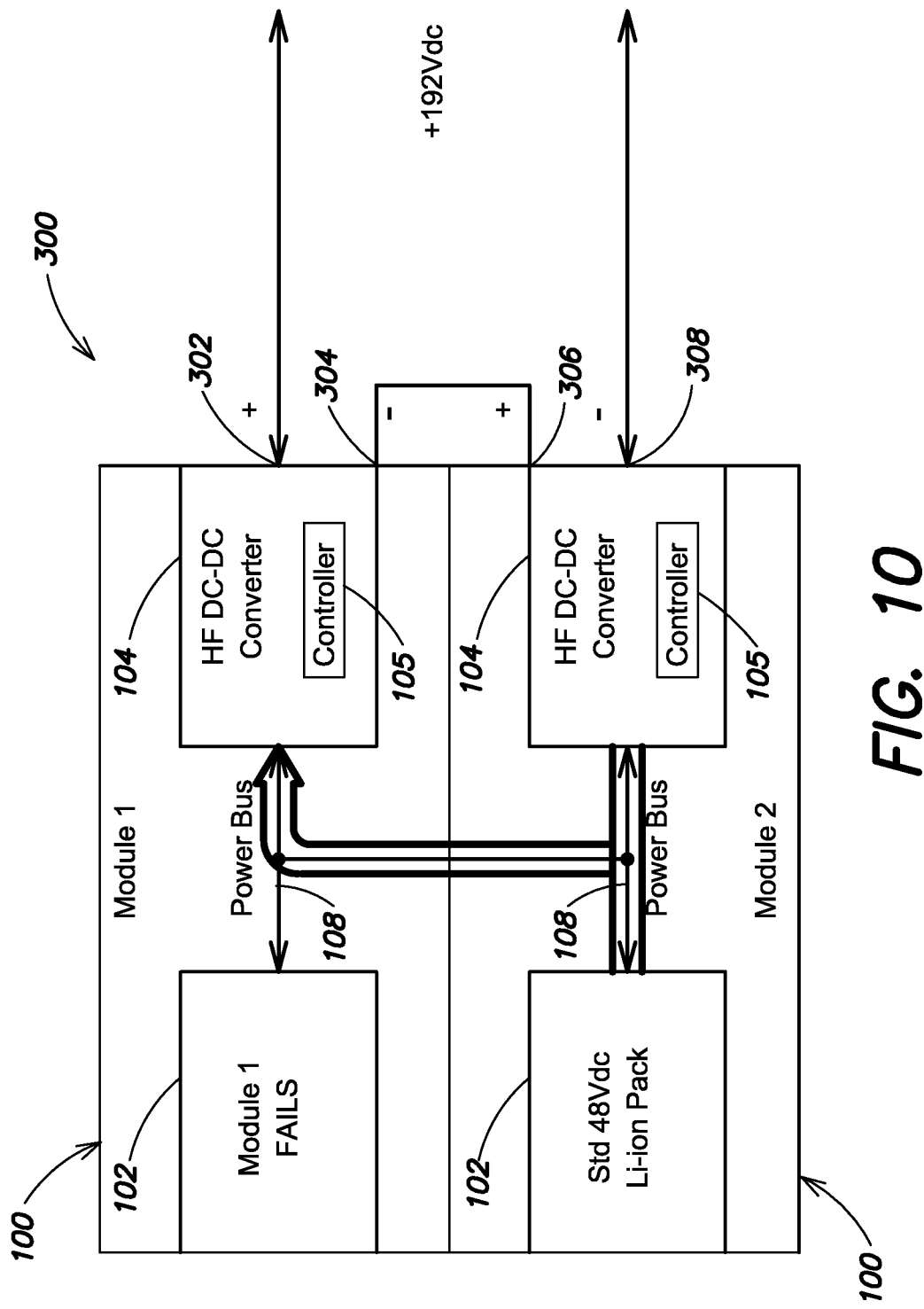
FIG. 10 is a block diagram illustrating redundant operation of two Li-ion adaptive battery pack modules coupled in series according to aspects of the current invention.

In at least one embodiment, the coupling of multiple LV power busses 108 together in parallel also provides redundancy. For example, FIG. 10 is a block diagram illustrating redundant operation of two Li-ion adaptive battery pack modules coupled in series. As shown in FIG. 10, the modules 100 (i.e., Module 1 and Module 2) are coupled together in series as described above with regard to FIG. 3. If both modules 100 are operational, the configuration 300 provides an 192 Vdc output. However, if one of the modules 100 fails, because the modules 100 share voltage and current from the batteries 102 equally, the configuration 300 is still able to provide a portion of the output power. For example, if Module 1 fails, both the converter 104 of Module 1 and the converter 104 of Module 2 will draw current and 48 Vdc from the battery 102 of Module 2. The controller 105 of each module 100 operates its corresponding converter 104 in a boost mode of operation to output a 96 Vdc voltage. By coupling the HV power busses 110 of Module 1 and Module 2 together in series as shown in FIG. 10, an output voltage of 192 Vdc can still be provided to the load. However, as the output power is generated from only one of the modules 100, the configuration 300 will operate at 50% reduced power capacity and runtime.

As described above, by connecting the High Voltage (HV) side of multiple adaptive battery pack modules together in parallel or series, and connecting the Low Voltage (LV) side of the adaptive battery packs in parallel, a wide range of voltage, power, and runtime requirements can be met. The coupling of the LV side of multiple adaptive battery pack modules together in parallel allows each module to share the voltage and current provided by each battery pack equally. The HV side of multiple adaptive battery pack modules can be coupled in series to create a high voltage battery pack module (e.g., 192 Vdc). The HV side of multiple adaptive battery pack modules can be coupled in parallel to create a battery pack module with increased power capacity and runtime.

The galvanic isolation provided by the converter 104 in each module 100 (e.g., by a transformer in the converter 104) allows for independent operation of each module 100. Each module 100 is individually controlled (e.g., by a local controller 105) to generate a desired output voltage, independent of what other modules 100 are currently outputting. This allows for the "hot-swapping" of each module 100 (i.e., each module 100 can be quickly coupled to, or de-decoupled from, the other operating modules 100 safely). According to at least one embodiment, each module 100 includes soft pre-charge and/or disconnect mechanisms to prevent arcing. Also, according to another embodiment, each module 100 includes a switch circuit operated by the local controller 105 to disconnect the module 100 from the other modules 100 to which it is coupled if the local controller 105 identifies a problem or need for service in the module 100.

Figure 11:
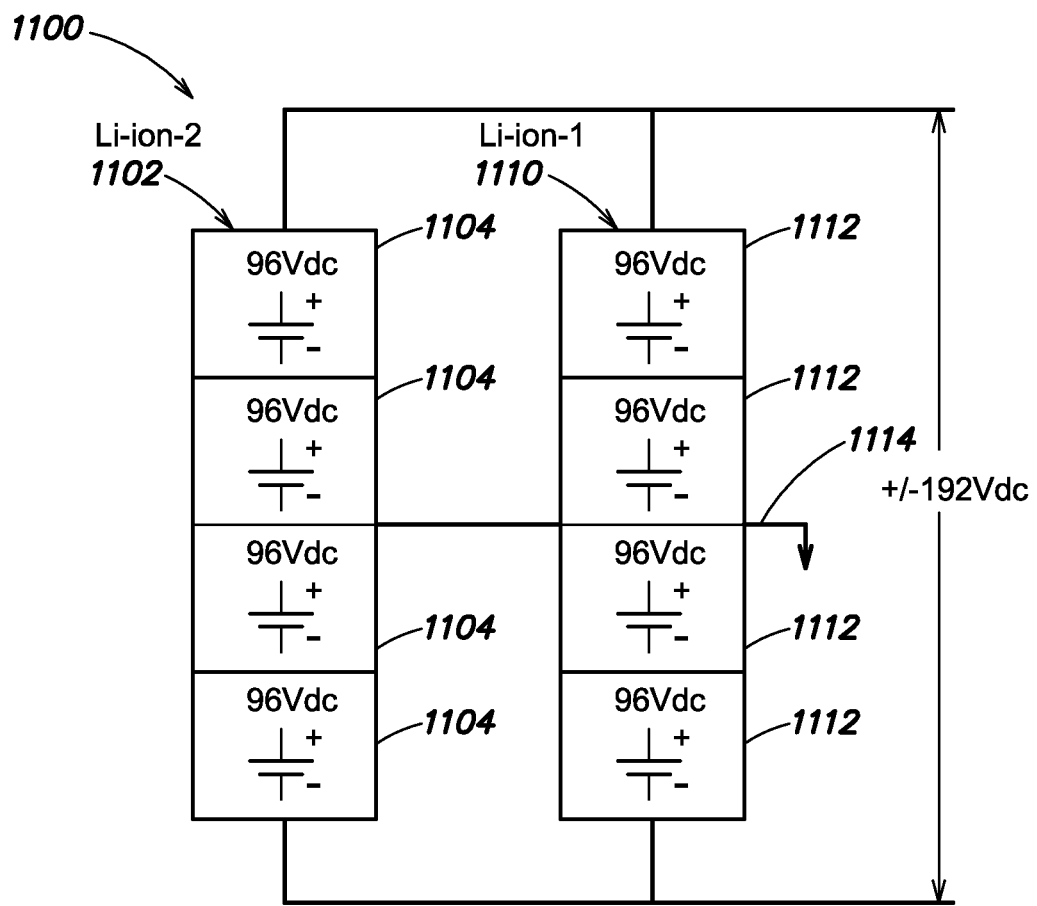
FIG. 11 is a block diagram illustrating a parallel configuration of Li-ion adaptive battery pack modules of different battery technologies according to aspects of the current invention.

According to one embodiment, the galvanic isolation of adaptive battery pack modules also allows for the coupling together of modules including batteries of different battery cell technologies/cell chemistry. For example, FIG. 11 is a block diagram illustrating a parallel configuration 1100 of Li-ion adaptive battery pack modules of different battery cell technologies/cell chemistry. The parallel configuration 1100 includes a first group 1102 of modules 1104 including batteries (e.g., battery 102 shown in FIG. 1) of a first Li-ion based battery cell technology and a second group 1110 of modules 1112 including batteries (e.g., battery 102 shown in FIG. 1) of a second Li-ion based battery cell technology. As similarly described above, each serially configured group of modules 1102, 1110 provides +/−192 Vdc to the output.

When the groups of modules 1102, 1110 are coupled together in parallel as shown in FIG. 11, the voltage provided to the output remains at +/−192 Vdc; however, the power capacity and runtime of the configuration 1100 is increased. This is possible, despite the differing battery cell technologies/cell chemistry, because of the galvanic isolation provided between the modules 1102, 1110. In one embodiment, modules 1104 in the first group 1102 include batteries with good short surge capability, (e.g., batteries including high discharge rate 2.0 Ah cells with 25-30 A discharge capability), and modules 1112 in the second group 1110 include batteries with extended runtime (e.g., batteries including low or mid-level discharge rate 2.0 Ah cells with 2.0 A or less discharge capability). However, in other embodiments, groups including batteries utilizing any different type of battery cell technology/cell chemistry may be coupled together in parallel due to the galvanic isolation.

Figure 12:
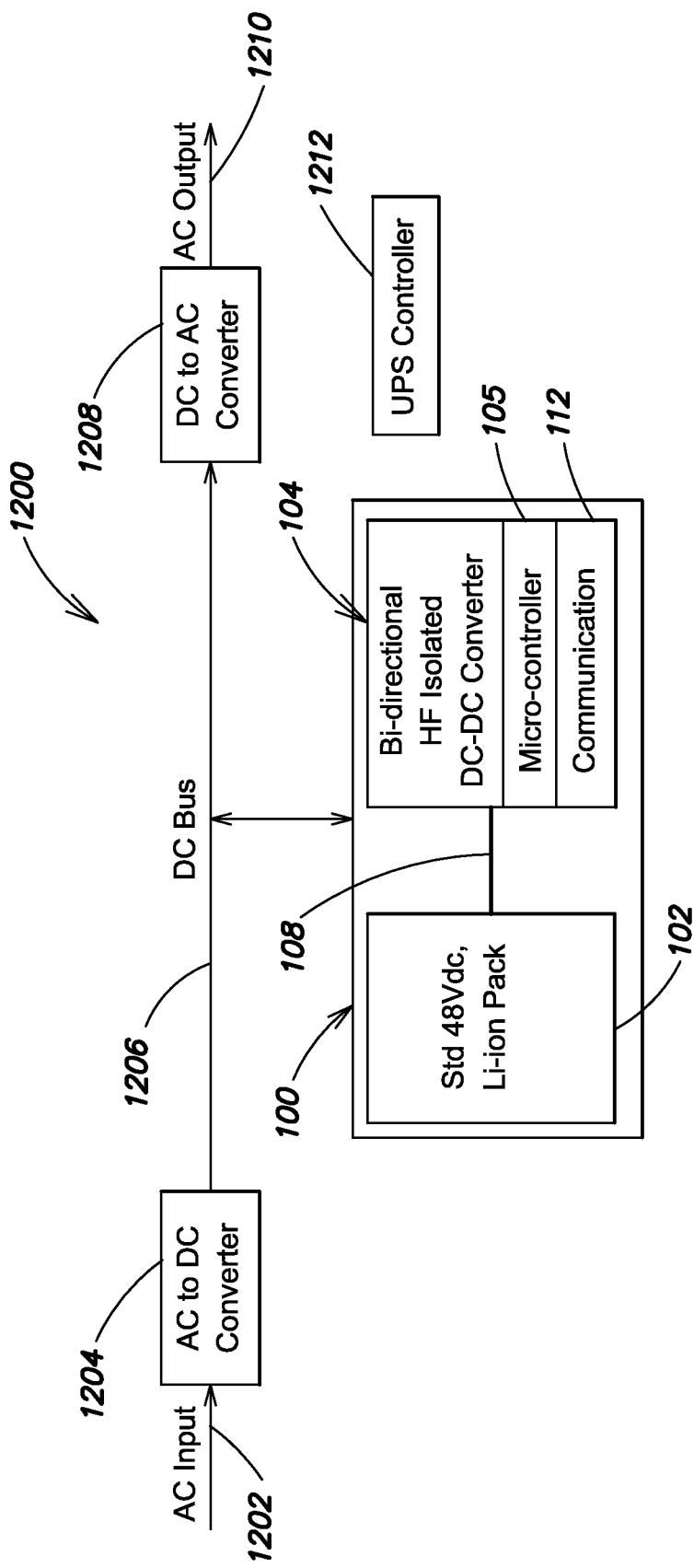
FIG. 12 is a block diagram illustrating the connection of a Li-ion adaptive battery pack module to a UPS according to aspects of the current invention.

According to one embodiment, any number of adaptive battery pack modules can be coupled directly to an Uninterruptible Power Supply (UPS). For example, FIG. 12 is a block diagram illustrating the connection of a Li-ion adaptive battery pack module (e.g., adaptive battery pack module 100 discussed above with regard to FIG. 1) to a UPS 1200. The UPS 1200 includes an AC input 1202, an AC to DC converter (e.g., a rectifier) 1204, a DC bus 1206, a DC to AC inverter 1208, and an AC output 1210. The AC to DC converter 1204 is coupled between the AC input 1202 and the DC bus 1206. The DC to AC inverter 1208 is coupled between the DC bus 1206 and the AC output 1210. In one embodiment, the adaptive battery pack module 100 is coupled directly to the DC bus 1206. In another embodiment, the module 100 is coupled to the DC bus 1206 via an external DC to DC converter.

In a normal mode of operation, the AC input 1202 receives input AC power from an AC power source. The AC to DC converter 1204 converts the input AC power into DC power and provides the DC power to the DC bus 1206. The DC power on the DC bus is converted to regulated AC power by the DC to AC inverter 1208 and the regulated AC power is provided to a load via the AC output 1210. The DC power on the DC bus is also provided to the module 100. The bidirectional converter 104 of the module is operated by the local controller 105 to convert the DC power from the DC bus into regulated DC power. The regulated DC power is provided to the battery 102, via the LV power bus 108, to charge the battery 102. The local controller 105 may also receive information/instructions from a UPS controller 1212, via the communication bus 112.

In a battery mode of operation (e.g., when the input AC power is insufficient to power a load coupled to the output 1210), the battery 102 discharges and DC power from the battery 102 is provided to the converter 104 via the LV power bus 108. The local controller 105 operates the bidirectional converter 104 to convert the DC power into regulated DC power. The regulated DC power is provided to the DC bus 1206 of the UPS 1200 and the DC to AC inverter 1208 converts the regulated DC power from the module into regulated AC power. The regulated AC power is provided to a load via the AC output 1210. As shown in FIG. 12, a single module is coupled to the UPS 1200; however, in other embodiments, any number of modules 100, coupled together in any number of different configurations (e.g., as shown and discussed above), may be connected to the UPS 1200 to provide desired DC power to the UPS 1200.

Figure 13:
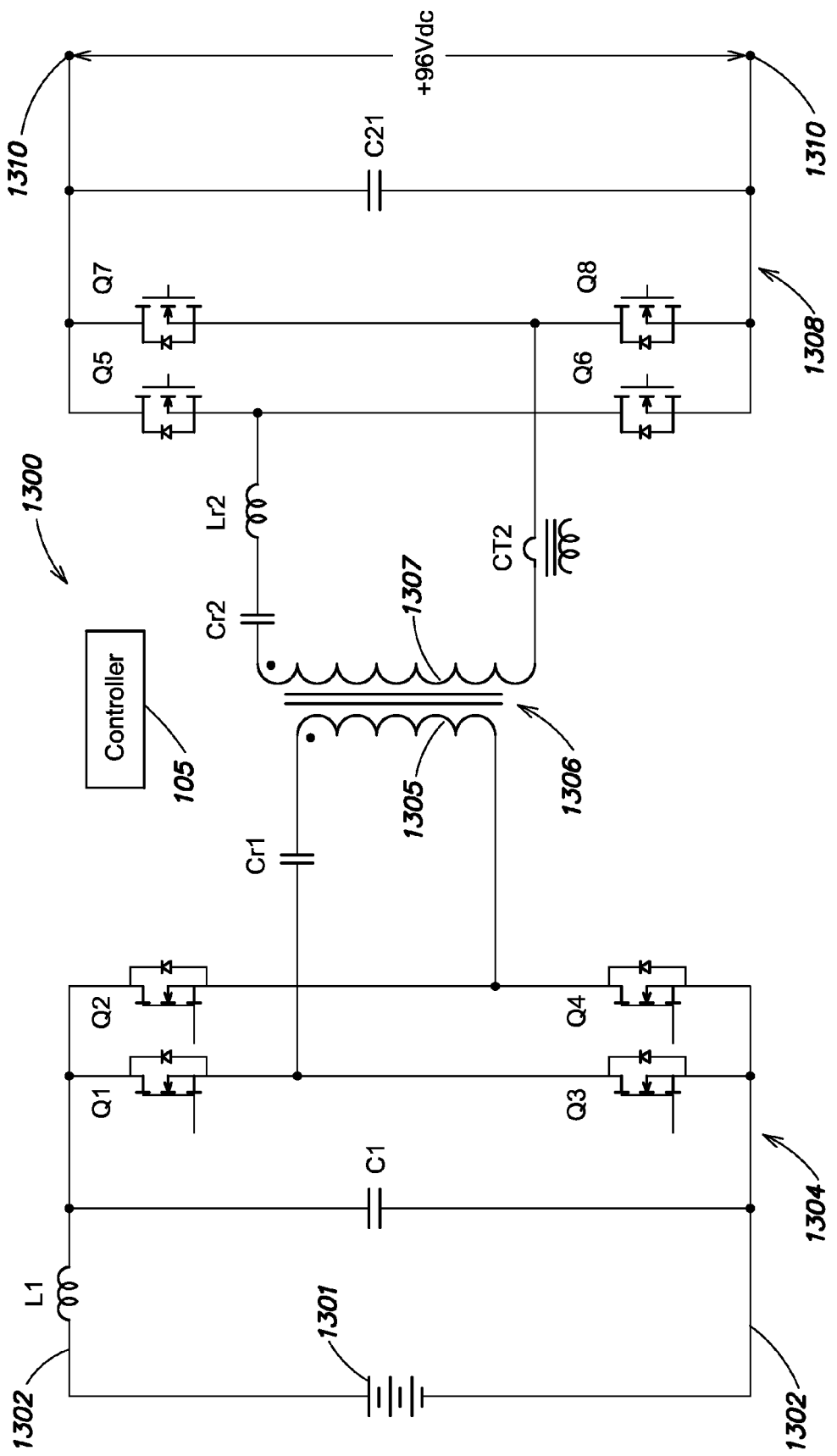
FIG. 13 is a circuit diagram of one embodiment of a bidirectional DC/DC converter according to aspects of the current invention.

FIG. 13 is a circuit diagram of one embodiment of a bidirectional DC/DC converter 1300 (e.g., such as the bidirectional DC/DC converter 104 shown in FIG. 1). The converter 1300 is a full bridge-to-full bridge series resonant converter that includes an input 1302, a first full bridge rectifier 1304, a transformer 1306, a second full bridge rectifier 1308, and an output 1310. The input 1302 is coupled to an input of the first full bridge rectifier 1304. An output of the first full bridge rectifier 1304 is coupled to a first winding 1305 of the transformer 1306. A second winding 1307 of the transformer 1306 is coupled to an input of the second full bridge rectifier 1308. The output 1310 is coupled an output of the second full bridge rectifier 1308.

The input 1302 is configured to be coupled to any number of different batteries in parallel. The multiple batteries coupled together in parallel are represented in FIG. 13 as a single battery 1301. For example, the battery 1301 may include any number of Li-ion batteries 102 from battery pack modules 100 coupled together in parallel on their LV side as discussed above. DC power from the battery 1301 is provided to the converter 1300. The first full bridge rectifier 1304 and the second full bridge rectifier 1308 are operated by the controller 105, in conjunction with the transformer 1306, to generate a desired voltage at the output 1310. In one embodiment, the converter is operated to output 96 Vdc. As discussed above, the output 1310 of the converter 1300 (i.e., the HV side of the converter 1300) may be coupled in series or parallel with other similar converters to generate a desired output. As also discussed above, the transformer 1306 provides galvanic isolation between the input 1302 and the output 1310.

Figure 14:
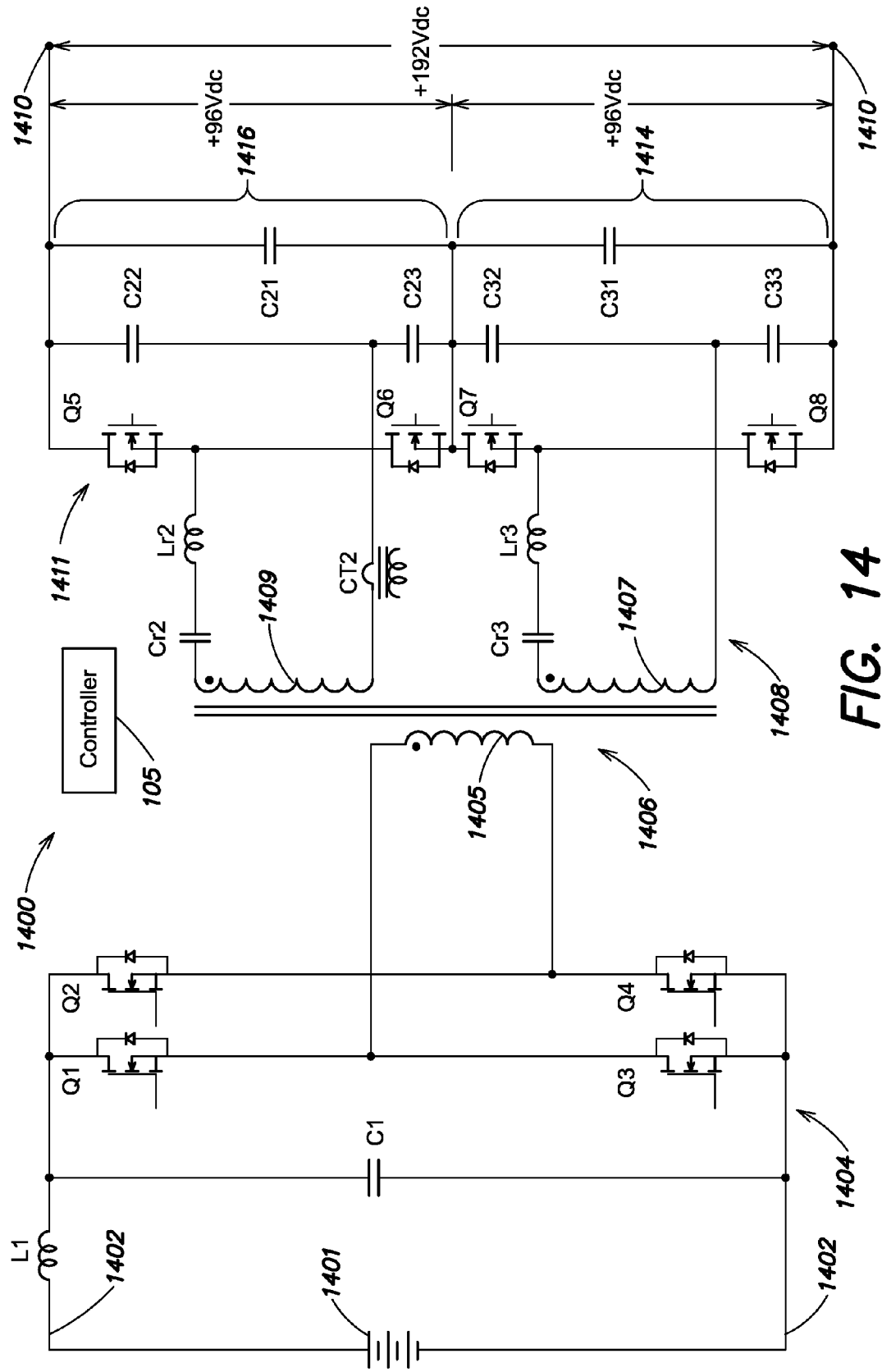
FIG. 14 is a circuit diagram of another embodiment of a bidirectional DC/DC converter according to aspects of the current invention.

FIG. 14 is a circuit diagram of another embodiment of a bidirectional DC/DC converter 1400 (e.g., such as the bidirectional DC/DC converter 104 shown in FIG. 1). The converter 1400 is a full bridge-to-half bridge series resonant converter that includes an input 1402, a full bridge rectifier 1404, a transformer 1406, a first half bridge rectifier 1408, a second half bridge rectifier 1411, and an output 1410. The input 1402 is coupled to an input of the full bridge rectifier 1404. An output of the full bridge rectifier 1404 is coupled to a primary winding 1405 of the transformer 1406. A first secondary winding 1407 of the transformer 1406 is coupled to an input of the first half bridge rectifier 1408. A second secondary winding 1409 of the transformer 1406 is coupled to an input of the second half bridge rectifier 1411. The output 1410 is coupled in series with an output 1414 of the first half bridge rectifier 1408 and an output 1416 of the second half bridge rectifier 1411.

The input 1402 is configured to be coupled to any number of different batteries in parallel. The multiple batteries coupled together in parallel are represented in FIG. 14 as a single battery 1401. For example, the battery 1401 may include any number of Li-ion batteries 102 from battery pack modules 100 coupled together in parallel on their LV side as discussed above. DC power from the battery 1401 is provided to the converter 1400. The full bridge rectifier 1404 and the first half bridge rectifier 1408 are operated by the controller 105, in conjunction with the transformer 1406, to generate a desired voltage (e.g., 96 Vdc) at the output 1414 of the first half bridge rectifier 1408. The full bridge rectifier 1404 and the second half bridge rectifier 1411 are operated by the controller 105, in conjunction with the transformer 1406, to generate a desired voltage (e.g., 96 Vdc) at the output 1416 of the second half bridge rectifier 1411. In one embodiment, as the output 1414 of the first half bridge rectifier 1408 and the output 1416 of the second half bridge rectifier 1411 are coupled together in series, a voltage of 192 Vdc is provided at the output 1410. As discussed above, output 1410 of the converter 1400 (i.e., the HV side of the converter 1400) may be coupled in series or parallel with other similar converters to generate a desired output. Also, the transformer 1406 provides galvanic isolation between the input 1402 and the output 1410.

According to other embodiments, any other type of bidirectional DC-DC converter may be utilized in a module 100 as the converter 104 to generate desired output power.

As discussed above, the adaptive battery pack modules 100 are capable of providing desired power to a load. Each adaptive battery pack module 100 is also capable of charging a corresponding battery 102. For example, in a charging mode of operation, each module 100 coupled to an external DC power source (e.g., a DC bus) receives DC power at its HV power bus 110 from the external DC power source. The bidirectional converter 104 of each module 100 converts the DC power from the external DC power source into low voltage DC power and provides the low voltage DC power to the LV power bus 108. As the LV power busses 108 of each module 100 are coupled together in parallel, the low voltage DC power from each converter 104 is combined on the LV busses 108 coupled in parallel and provided to each battery 102 to charge the batteries.

As discussed above, each module 100 is capable of providing 96 Vdc; however, in other embodiments, the modules 100 may be configured differently to provide any other desired output voltage. As also discussed above, adaptive battery pack modules 100 are combined to generate 384 Vdc; however, in other embodiments, any number of adaptive battery pack modules 100 may be combined in any number of ways to generate an output voltage less than or greater than 384 Vdc.

As discussed above, the adaptive battery pack modules 100 may be utilized with a UPS. In other embodiments, the adaptive battery pack modules 100 may be utilized in any other type of system where a DC source is needed to provide DC power (e.g., in an energy storage system in a grid network).

As discussed above, each battery 102 is an advanced "smart" battery including a BMS. However, in at least one embodiment, the battery 102 does not include s BMS. As also discussed above, each battery 102 is a Li-ion based battery; however, in other embodiments, the battery 102 may be based on some other battery technology.

As also discussed above, each module 100 includes a single DC-DC converter; however, in other embodiments, a module may include more than one converter configured to generate a desired output. For example, in at least one embodiment, a module 100 includes multiple converters coupled in series to generate a desired high voltage output.

As discussed above, the LV side of each adaptive battery pack module 100 in a group of modules may be coupled together in parallel to allow each of the modules 100 to share power. However, in other embodiments, a group of adaptive battery pack modules 100 may only be coupled together, in series or parallel, on the HV side to generate a desired output and may not be coupled together in parallel on the LV side. In such an embodiment, by only coupling the modules 100 together, in series or parallel, on the HV side and not the LV side, the modules 100 may still be configured to generate a desired total output without the sharing of power (and redundancy) provided by the coupling together of the LV sides.

In at least one embodiment, a Li-ion based adaptive battery pack is provided that utilizes a building block approach to create high battery voltage for energy storage applications (e.g., such as with an Uninterruptible Power Supply (UPS)). The adaptive battery pack module includes a Li-ion battery and a high frequency, high efficiency, bidirectional, and galvanically isolated DC-DC converter.

The bidirectional converter serves as both a charger and a boost converter. By connecting the High Voltage (HV) side of multiple adaptive battery pack modules together in parallel or series, and connecting the Low Voltage (LV) side of the adaptive battery packs in parallel, a wide range of voltage and power requirements can be met. The coupling of the LV side of multiple adaptive battery pack modules together in parallel allows each module to share the voltage and current provided by each battery pack equally. The HV side of multiple adaptive battery pack modules can be coupled in series to create a high voltage battery pack module. The HV side of multiple adaptive battery pack modules can be coupled in parallel to create a battery pack module with increased power capacity and runtime.

The galvanic isolation provided by the converter in each module allows for independent operation of each module. Each module is individually controlled to generate a desired output voltage, independent of what other modules are currently outputting. This allows for the "hot-swapping" of each module and for the coupling together of modules including batteries of different battery technologies. In addition, according to one embodiment, due to the isolation of each module, different grounding options (e.g., earth ground, neutral, chassis, floating etc.) on the LV side of each module can be utilized which may improve safety and/or reliability. For example, in embodiment where chassis ground is utilized on the LV side of a module, the isolation of the module may help limit Electromagnetic Interference (EMI).

By utilizing a standard battery in an adaptive battery pack module, as discussed above, the module can be configured, relatively easily, alone or in combination with other modules, to provide a desired output. For example, in at least one embodiment, by utilizing a standard battery in a module, the module may only undergo a single round of regulatory certification for the standard battery. As a result, such modules can easily and quickly be combined with other modules to generate a desired output, without requiring the re-certification of the combined system. In addition, by standardizing a battery system based on a standard battery pack, as discussed above, the reliability and robustness of the battery system can be improved.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An adaptive battery pack module comprising:
   a Li-ion battery;
   a low-voltage bus coupled to the Li-ion battery;
   a bi-directional DC-DC converter coupled to the low-voltage bus;
   a low-voltage output coupled to the low-voltage bus;
   a high-voltage output; and
   a high-voltage bus coupled between the bi-directional DC-DC converter and the high-voltage output,
   wherein the low-voltage output is configured to be coupled to at least one Li-ion battery of at least one external battery pack module and to provide DC power from the Li-ion battery to the at least one external battery pack module, and wherein the bi-directional DC-DC converter is configured to receive DC power from the Li-ion battery and the at least one Li-ion battery of the at least one external battery pack module via the low-voltage bus, convert the received DC power into output DC power, and provide the output DC power to the high-voltage bus.

2. The adaptive battery pack module of claim 1, wherein the bi-directional DC-DC converter is configured to provide galvanic isolation between the low-voltage bus and the high-voltage bus.

3. The adaptive battery pack module of claim 2, wherein the bi-directional DC-DC converter includes a series resonant converter.

4. The adaptive battery pack module of claim 3, wherein the bi-directional DC-DC converter includes one of a full bridge to full bridge converter and a full bridge to half bridge converter.

5. The adaptive battery pack module of claim 3, wherein the bi-directional DC-DC converter includes a transformer coupled between the low-voltage bus and the high-voltage bus.

6. The adaptive battery pack module of claim 2, wherein the high voltage output is configured to be coupled to an output of the at least one external battery pack module in one of a series configuration and a parallel configuration.

7. The adaptive battery pack module of claim 2, wherein the high voltage output is configured to be coupled to an external DC power source, and wherein the bi-directional DC-DC converter is further configured to receive, via the high voltage output, DC power from the external DC power source, convert the received DC power from the external DC power source into low voltage DC power, and provide the low voltage DC power to the Li-ion battery and the at least one Li-ion battery of the at least one external battery pack module via the low-voltage bus.

8. The adaptive battery pack module of claim 7, in combination with a rectifier, a DC bus, and an inverter,
wherein the DC bus is coupled between the rectifier and the inverter and configured to receive rectified DC power from the rectifier, and
wherein the high-voltage output is further configured to be coupled to the DC bus and to receive the rectified DC power from the DC bus.

9. The adaptive battery pack module of claim 2, wherein the Li-ion battery includes a plurality of cells and a Battery Management System (BMS) configured to monitor the plurality of cells and operate the Li-ion battery to output DC power at a desired voltage level.

10. The adaptive battery pack module of claim 2, further comprising a serial communication link coupled between the Li-ion battery and the bi-directional DC-DC converter.

11. The adaptive battery pack module of claim 2, further comprising a communication bus coupled between the bidirectional DC-DC converter and a communication interface.

12. A method for providing DC power to a load with a plurality of adaptive battery pack modules, each module comprising a Li-ion battery configured to provide DC power, a low-voltage bus coupled to the Li-ion battery, a bi-directional DC-DC converter coupled to the low-voltage bus, and a high-voltage bus coupled to the bi-directional DC-DC converter, the method comprising:
coupling the low-voltage busses of each module together in parallel;
sharing, via the low-voltage busses coupled in parallel, the DC power from each Li-ion battery with the bi-directional DC-DC converter of each module;
operating each bi-directional DC-DC converter in a boost mode of operation to convert the shared DC power into output DC power;
combining the output DC power from each bi-directional DC-DC converter together to generate a combined output DC power; and
providing the combined output DC power to the load.

13. The method of claim 12, further comprising:
receiving, with each bi-directional DC-DC converter, DC power from an external DC power source;
operating each bi-directional DC-DC converter in a charge mode of operation to convert the DC power from the external DC power source into low voltage DC power; and
charging, via the low-voltage busses coupled in parallel, each Li-ion battery with the low voltage DC power.

14. The method of claim 12, further comprising coupling the high-voltage busses of each module together in series, and wherein combining the output DC power from each bi-directional DC-DC converter together includes combining the output DC power from each bi-directional DC-DC converter together to generate the combined output DC power having a desired output voltage level.

15. The method of claim 12, further comprising coupling the high-voltage busses of each module together in parallel, and wherein combining the output DC power from each bi-directional DC-DC converter together includes combining the output DC power from each bi-directional DC-DC converter together to generate the combined output DC power having one of a desired output power capacity and runtime.

16. The method of claim 12, further comprising providing galvanic isolation between the low-voltage bus and the high-voltage bus of each module.

17. A battery system comprising:
a plurality of adaptive battery pack modules, each module comprising:
a Li-ion battery configured to provide DC power;
a bi-directional DC-DC converter coupled to the Li-ion battery; and
an output; and
means for sharing DC power, from the Li-ion batteries, between the bi-directional DC-DC converter of each of the plurality of modules;
wherein the bi-directional DC-DC converter of each of the plurality of module is configured to receive the shared DC power from the Li-ion batteries, convert the shared DC power into output DC power, and provide the output DC power to the output.

18. The battery system of claim 17, further comprising means for providing galvanic isolation between each of the plurality of adaptive battery pack modules.

19. The battery system of claim 18, further comprising means for combining the output DC power of each bi-directional DC-DC converter to generate a combined output DC power having one of a desired output voltage, power capacity, and runtime.

20. The battery system of claim 17, wherein the Li-ion battery of a first one of the plurality of adaptive battery pack modules is constructed of a first battery cell technology and the Li-ion battery of a second one of the plurality of adaptive battery pack modules is constructed of a second battery cell technology which is different than the first battery cell technology.

* * * * *